Dec. 15, 1925. Re. 16,230

A. ROSZKOWSKI

COMPRESSOR

Original Filed Feb. 9, 1920

Witnesses
Lloyd M. Keighley

Inventor
Adolf Roszkowski

By J. Ralph Fehr
His Attorney

Reissued Dec. 15, 1925. Re. 16,230

UNITED STATES PATENT OFFICE.

ADOLF ROSZKOWSKI, OF NEW YORK, N. Y., ASSIGNOR, BY MESNE ASSIGNMENTS, TO DELCO-LIGHT COMPANY, OF DAYTON, OHIO, A CORPORATION OF DELAWARE.

COMPRESSOR.

Original No. 1,383,860, dated July 5, 1921, Serial No. 357,485, filed February 9, 1920. Application for reissue filed June 27, 1923. Serial No. 648,115.

*To all whom it may concern:*

Be it known that I, ADOLF ROSZKOWSKI, a subject of Russia, residing at New York, county of New York, and State of New York, have invented certain new and useful Improvements in Compressors, of which the following is a full, clear, and exact description.

This invention relates to an improvement in automatic air compressor apparatus, designated particularly for use with an improved compressed air supply system for railroad stations forming the subject matter of Patent No. 1,240,373 issued to me September 18, 1917.

Briefly, such system comprises reservoirs containing water and compressed air located beneath the surface of the ground at the water station, the reservoirs being connected with each other, with a more or less remote pump station for the supply of water and air to such reservoirs, and with a standpipe outlet from which the water is withdrawn for use. A particular valve arrangement between the reservoirs, supply and service pipes renders the system self distributing and self regulating.

The system contemplates the continued use of the compressed air of the reservoirs, that is the use of such air as a motive force for the water to a low limit of pressure of such air and the restoration of the maximum air pressure through an additional supply of water from the pump station.

In the practical use of such system, however, it has been found that there is a distinct but slow dissolution of the compressed air in the water, and as such is lost for effective uses, it must be compensated for, preferably by replacement.

The present invention is designed to provide an apparatus for the automatic replacement of such dissolved or absorbed portion of the compressed air, and in more specific detail comprises two comparatively small tanks preferably located at or near the pump station of the system and on a level below that of the reservoirs. Two-way valves, connected for simultaneous but reverse action, are provided, either serving to connect a particular tank with the water pipe from the reservoir and air pipe thereto, while the other at the same time connects the other tank, at both inlet and outlet with the atmosphere. The reservoir connected tank, which by a previous position of the valve has been connected with the atmosphere and is therefore filled with air under atmospheric pressure, is subjected to the pressure of the water from the reservoirs, under the head incident to the difference in level, and the contained air forced into the system. The other tank, which in the previous position of the valves has gradually filled with water from the reservoirs in forcing the air therefrom into the system, is the present position of the valves, open to the atmosphere, draining it of water and, of course, filling it with air under atmospheric pressure to be forced into the system when the valves are reversed.

Figures 1, 2:
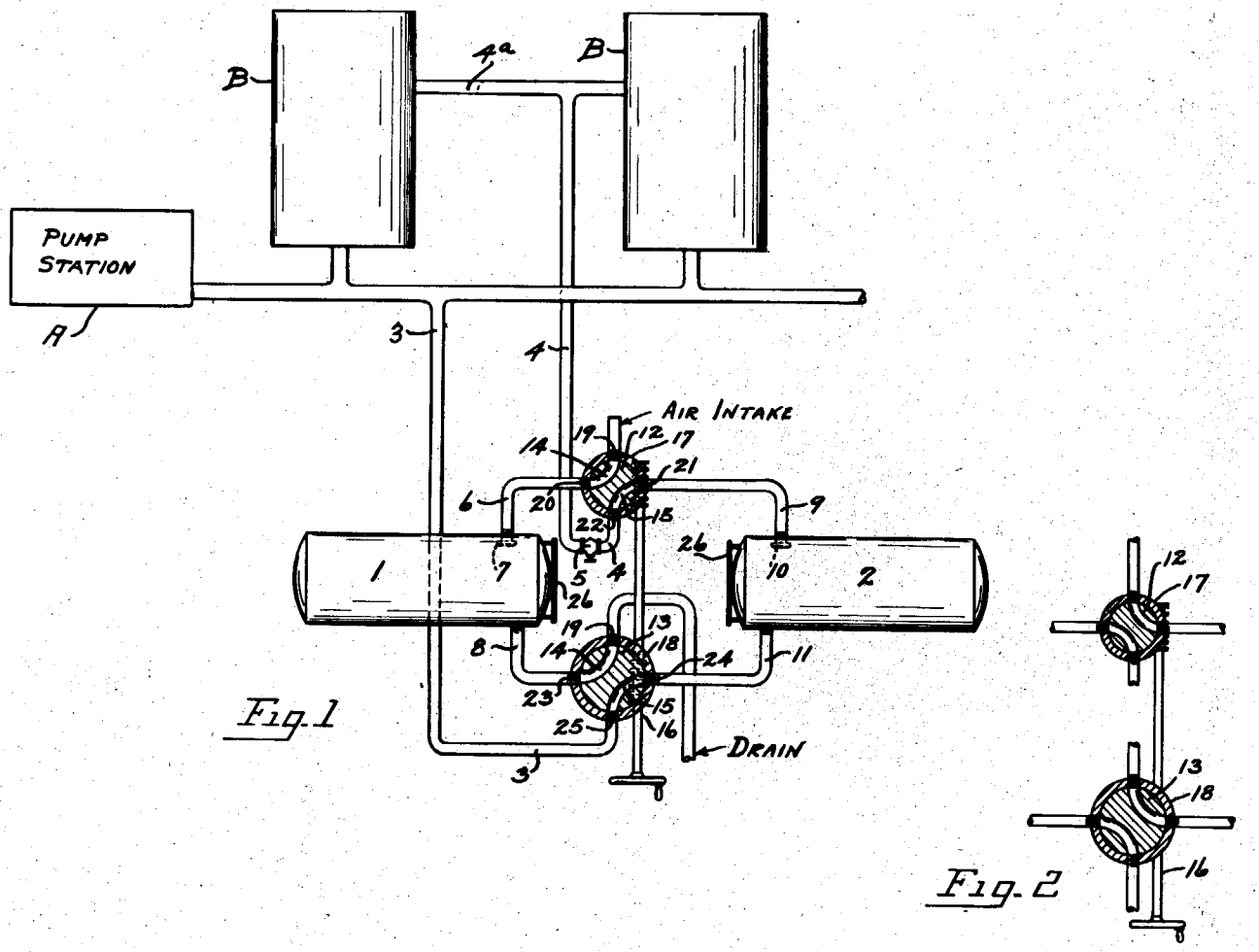
Fig. 1 is a view illustrating more or less diagrammatically the improved compressor apparatus.
Fig. 2 is a section of the valve.

The improved construction comprises two air receiving tanks, 1 and 2, preferably located near the pump station A of the improved system, and on a level below the water storage or service reservoirs B of such system to provide a head of water from the service reservoirs to the tanks through the pipe 3, leading from such service reservoirs.

An air supply pipe 4 leads to the air pressure pipe 4ª for serving the reservoirs, and this pipe has a valve 5 which opens toward the reservoirs.

Tank 1 has an air pipe 6 opening therefrom near the top with a water excluding valve 7 at the entrant end thereof, and also a water pipe 8 opening therefrom near the bottom; while tank 2 has exactly similar pipe arrangement, that is air pipe 9, with valve 10, and water pipe 11.

Control valves 12 and 13 are provided for the compressor, these valves each having two non-communication passages 14 and 15. The valves are connected, as by a rod or other appropriate means 16, whereby such valves are simultaneously operated, but with the parts thereof relatively reversed under all working conditions.

The respective valve casings 17 and 18, are each provided with a port 19, leading to the atmosphere, the casing 17 or valve 12 having ports 20 and 21 for the connecting thereto of the air pipes 6 and 9 of the respective tanks, and another port 22 for the connection of the air supply pipe 4. The casing 18 of valve 13 has similar ports, that is ports 23, 24 for connection of the respective water pipes 8 and 11 of the tanks 1 and 2, and a port 25 to which the pipe 3 is connected.

The passages 14 and 15 of the valves are so relatively disposed that in one position for example that illustrated in the drawings, the air and water pipes of tank 1 are open to the atmosphere, and hence this tank is charged with air under atmospheric pressure. The air and water pipes of tank 2, however, are in this position of the valves connected with the water pipe 3 and air supply pipe 4 of the system. The water under the head described, will force the air from tank 2 into the system to replenish the absorbed air. When tank 2 has become substantially filled with water, as may be indicated as an external gage 26, the valves are operated by means 16 to reverse them, utilizing tank 1 as the service tank, and opening tank 2 to the atmosphere for drainage of the water therefrom and replacement of such water with air for charging purposes on the next operation of the valves.

Beyond the mere change of the valves, the compressor apparatus is entirely automatic in its operation, and will effectively maintain a constant air volume in the system.

It is obvious that the invention is not limited to the use of two air tanks, but is applicable to the use of one or more air tanks depending on the needs of the system. If but one tank, such as tank 1, only be required, the ports 21 and 24 of valve casings 17 and 18 can be omitted. The controlling mechanism can be operated to simply disconnect tank 1 from the water pressure pipe 3 and the air supply 4, while the tank is vented to atmosphere and drained. This arrangement is shown in Fig. 1. Then the valves 12 and 13 can be turned simultaneously to disconnect the tank 1 from atmosphere and to connect the tank 1 with the water pressure pipe 3 and the air pipe 4. After air in tank 1 has been forced by direct contact with water from the water pressure pipe 3 into the storage reservoirs B, the valves 12 and 13 can be returned to the positions shown in Fig. 1 in order that the tank 1 may receive air, awaiting the time when again necessary to supply air to the storage reservoir.

In other words, there are certain features of the invention which are present regardless of whether one or a plurality of air tanks are employed. Considering the operations performed by the controlling mechanism in cooperation with any one of the tanks, the invention provides air charging apparatus which can be rendered operative to introduce air into the water system while the connection between the pump and water reservoir is maintained. The air is forced from a tank into the water system by direct contact with a body of water under pressure thereby reducing the number of moving parts to the minimum. The valve mechanism is controlled by a single manually operable member which, in one position, causes a tank to be drained and filled with air, and, in another position, causes the tank to be connected with the water system.

While the form of mechanism herein shown and described constitutes a preferred embodiment of one form of invention, it is to be understood that other forms might be adopted and various changes and alterations made in the shape, size, and proportion of the elements therein without departing from the spirit and scope of the invention.

What is claimed is as follows:

1. An air compressor for a water system using compressed air as a motive power, comprising two tanks, arranged to have a water head from the system, and means for simultaneously connecting one tank with such water head and compressed air service of such system and the other tank with the atmosphere.

2. An air compressor for a water system using compressed air as a motive power, comprising two tanks, arranged to have a water head from the system, and means for simultaneously connecting one tank with such water head and compressed air service of such system and the other tank with the atmosphere, said means being reversible with respect to the tanks at will.

3. An air compressor for a water system using compressed air as a motive power, comprising two tanks, arranged to have a water head from the system, a valve for connecting each tank either with the water head from the system and the compressed air service, or with the atmosphere at will.

4. An air compressor for a water system using compressed air as a motive power, comprising two tanks, arranged to have a water head from the system, a valve for connecting each tank either with the water head from the system and the compressed air service, or with the atmosphere at will, and means for simultaneously and reversely operating said valves with respect to the tanks.

5. An air compressor for a water system using compressed air as a motive power, two tanks arranged below the system to provide a water head therefrom, a water pipe leading from the system, a compressed air pipe leading to the compressed air service of the system, an air pipe leading from the top of each tank, a water pipe leading from the bottom of each tank and a two way valve for each tank, one of said valves having passages adapted in the operation of the valve to connect the air pipe of one tank with the system compressed air pipe and the air pipe of the other tank with the atmosphere, the other of said valves having passages to connect the water pipe of one tank with the system water pipe and the water pipe of the other tank with the atmosphere.

6. An air compressor for a water system using compressed air as a motive power, two tanks arranged below the system to provide a water head therefrom, a water pipe leading from the system, a compressed air pipe leading to the compressed air service of the system, an air pipe leading from the tops of each tank, a water pipe leading from the bottom of each tank, and a two way valve for each tank, one of said valves having passages adapted in the operation of the valve to connect the air pipe of one tank with the system compressed air pipe and the air pipe of the other tank with the atmosphere, the other of said valves having passages to connect the water pipe of one tank with the system water pipe and the water pipe of the other tank with the atmosphere, and means to connect the valves for simultaneous operation to connect one tank in the system while opening the other to the atmosphere.

7. An air compressor for a water system including a source of water pressure comprising the combination with a tank for receiving a quantity of air; of apparatus for utilizing water under pressure from said system for forcing air from said tank into said system by directly contacting with the air in the tank; means for controlling said apparatus independently of the operation of said source of water pressure and while the connection between the water system and source is maintained.

8. An air compressor for a water system, including a pump comprising the combination with a tank for receiving a quantity of air; of apparatus for utilizing water under pressure from said system for forcing air from said tank into said system by directly contacting with the air in the tank, said apparatus being operable independently of the movements of the pump and while the connection between the pump and water system is maintained; and means for rendering said apparatus operative when desired.

9. An air compressor for a water system, including a pump and storage reservoir, comprising the combination with a tank for receiving a quantity of air; of means controllable independently of the operation of the pump and while the connection between the pump and reservoir is established for causing the tank to be connected with atmosphere, and for causing the tank to be disconnected from atmosphere and water from said system to enter said tank and to force, by direct contact, the air in the tank into the water system.

10. An air compressor for a water system, including a pump and storage reservoir, comprising the combination with a tank for receiving a quantity of air; of manual operable means, operable while the connection between the pump and reservoir is maintained, for causing the tank to be filled with air, and for causing the tank to be filled with water from the pressure system to drive air from said tank into the reservoir.

11. An air compressor for a water system, including a pump and a storage reservoir, comprising the combination with a tank for receiving a quantity of air; of apparatus including a single manually operable member movable into one position for causing the tank to be filled with air, and movable into another position to cause said tank to be filled with water under pressure from the system to force air from said tank into said reservoir.

12. An air compressor for a water system, including a pump and a storage reservoir, comprising the combination with a storage reservoir, comprising the combination with a tank for receiving a quantity of air; of means for venting and draining said tank while the pump remains connected to the reservoir; means for causing water from the system to fill the tank and air to flow from the tank into the reservoir; and means for rendering said first and second means successively operative.

13. An air compressor for a water system, including a pump and a storage reservoir, comprising the combination with a tank for receiving a quantity of air; of means for venting and draining said tank; means for causing water from the system to fill the tank and air to flow from said tank into the reservoir, and a single manually operable member for rendering said first and second means successively operative.

14. An air compressor for a water system, including a pump and a storage reservoir, comprising the combination with a tank and pipes connected respectively adjacent the bottom and top of the tank; a valve for connecting the bottom pipe either with the water system or to a drain; a second valve for connecting the top pipe either with the reservoir or with atmosphere; and a common valve operating member for simultaneously connecting the tank with atmosphere and a drain, or for simultaneously connecting the tank with the water system and reservoir.

ADOLF ROSZKOWSKI.